US010815133B2

(12) United States Patent
Geboers et al.

(10) Patent No.: US 10,815,133 B2
(45) Date of Patent: Oct. 27, 2020

(54) FLUID PURIFICATION SYSTEM AND METHOD

(71) Applicant: SIGNIFY HOLDING B.V., Eindhoven (NL)

(72) Inventors: Jacques Maria Jozef Geboers, Neerpelt (BE); Merlijn Antonius Petrus Maria Janssen, Dolaszewo (PL)

(73) Assignee: SIGNIFY HOLDING B.V., Eindhoven (NL)

( * ) Notice: Subject to any disclaimer, the term of this patent is extended or adjusted under 35 U.S.C. 154(b) by 37 days.

(21) Appl. No.: 16/077,438

(22) PCT Filed: Feb. 16, 2017

(86) PCT No.: PCT/EP2017/053515
§ 371 (c)(1),
(2) Date: Aug. 10, 2018

(87) PCT Pub. No.: WO2017/140790
PCT Pub. Date: Aug. 24, 2017

(65) Prior Publication Data
US 2019/0047877 A1 Feb. 14, 2019

(30) Foreign Application Priority Data
Feb. 18, 2016 (EP) .................... 16156294

(51) Int. Cl.
*C02F 1/32* (2006.01)
*E03C 1/04* (2006.01)
(Continued)

(52) U.S. Cl.
CPC ............ *C02F 1/325* (2013.01); *E03C 1/0404* (2013.01); *E03C 1/046* (2013.01); *B67D 2001/075* (2013.01); *B67D 2210/00015* (2013.01); *C02F 2201/003* (2013.01); *C02F 2201/328* (2013.01); *C02F 2201/3222* (2013.01); *C02F 2201/3227* (2013.01); *C02F 2201/3228* (2013.01);
(Continued)

(58) Field of Classification Search
CPC ................ C02F 1/325; C02F 2201/328; C02F 2201/3227; C02F 2201/003; C02F 2201/3222; C02F 2201/3228; C02F 2303/04; C02F 2305/10; C02F 2307/10; A61L 2/10
See application file for complete search history.

(56) References Cited

U.S. PATENT DOCUMENTS 7,270,748 B1 9/2007 Lieggi
2013/0236353 A1 9/2013 Blechschmidt et al.
(Continued)

FOREIGN PATENT DOCUMENTS

EP 1703024 A1 9/2006
WO 2008120165 A1 10/2008
(Continued)

*Primary Examiner* — Lessanework Seifu
(74) *Attorney, Agent, or Firm* — Daniel J. Piotrowski

(57) ABSTRACT

An in-line fluid purification system uses a jacket (26) surrounding a fluid passageway (28), formed of a UV transmissive material. The jacket (26) may be surrounded by a UV reflective material (30). UV radiation (20) is coupled into the jacket (26), and the jacket (26) disperses and reflects the radiation over the entire cross section of the passageway (28). In this way, UV illumination of the full cross section of a fluid passageway (28) is ensured.

12 Claims, 2 Drawing Sheets

(51) Int. Cl.
*E03C 1/046* (2006.01)
*B67D 1/07* (2006.01)
(52) U.S. Cl.
CPC ...... *C02F 2303/04* (2013.01); *C02F 2305/10* (2013.01); *C02F 2307/10* (2013.01)

(56) References Cited

U.S. PATENT DOCUMENTS

2015/0060693 A1 3/2015 Lee et al.
2015/0158741 A1 6/2015 Lee et al.

FOREIGN PATENT DOCUMENTS

| WO | 2011055133 | A2 | 5/2011 |
| WO | 2013064154 | A1 | 5/2013 |
| WO | 2015133968 | A1 | 9/2015 |
| WO | 2016016603 | A1 | 2/2016 |

FLUID PURIFICATION SYSTEM AND METHOD

CROSS-REFERENCE TO PRIOR APPLICATIONS

This application is the U.S. National Phase application under 35 U.S.C. § 371 of International Application No. PCT/EP2017/053515, filed on Feb. 16, 2017 which claims the benefit of European Patent Application No. 16156294.7, filed on Feb. 18, 2016. These applications are hereby incorporated by reference herein.

FIELD OF THE INVENTION

The invention relates to the field of fluid disinfection, and more specifically to ultraviolet (UV) fluid disinfection, for example using UV-C radiation.

BACKGROUND OF THE INVENTION

The importance of fluid disinfection for providing a fluid that contains fewer harmful microorganisms has widely been recognized. This becomes even more prescient when the fluid in question is, for example, water that is being prepared for human or animal consumption, although UV radiation is widely known for use in the disinfection other fluids such as air.

Water free from active microorganisms can become contaminated in a matter of hours or days when standing still in a water dispensing system such as a water tap. The microbiological contamination partly comes from the ambient air around the point where the water is dispensed but can also come from contamination by touching the dispensing point or from microorganisms in a biofilm formed on surfaces.

In some water dispensing systems, the dispensing head is heated from time to time to kill all micro-organisms. Also plastics with silver ions may be used to prevent the growth of a bio film on the plastic surface being a source of microbiological contamination.

Fluid disinfection with UV radiation was first used in the 1960's; it has numerous advantages over other methods such as chlorination, especially when the fluid is water that is to be consumed.

The disinfection of the fluid is achieved by deactivating the DNA of microorganisms. Further advantages of the use of UV to disinfect fluids are simple installation, less maintenance requirements and space efficiency.

The use of UV to treat a fluid eliminates the need to use a chemical process thus removing the risk of a chemical smell or taste in the fluid after disinfection has been completed.

Current UV water disinfection technologies mainly use mercury discharge lamps to provide the UV radiation that disinfects the water. Generally these systems provide UV radiation to fluids flowing past them. The level of disinfection depends on the total UV dose that the water receives. The higher the dose, the higher the level of disinfection, or the lower the amount of remaining pathogens.

Ultraviolet radiation disrupts the DNA of microbes and thereby prevents reproduction. Without reproduction, the microbes become far less of a danger to health.

UV-C radiation in the short wavelength range of 100-280 nm acts on thymine, one of the four base nucleotides in DNA. When a UV photon is absorbed by a thymine molecule that is adjacent to another thymine within a DNA strand, a covalent bond or dimer between the molecules may be created, this is different to the normal structure of DNA wherein the bases always pair up with the same partner on the opposite strand of DNA. This causes a bulge to occur between the two bases, the bulge prevents enzymes from "reading" the DNA and copying it, thus neutering the microbe.

UV-C sources traditionally are bulky: they are not easily embedded at the point of dispensing. Moving the UV-C source more upstream, for example under a sink, or in a water dispense machine, has a disadvantage that piping between UV-C system and dispense point remains prone to contamination.

Recently, UV-C LEDs have become available. Their UV-C output power is still low compared to mercury lamps, but LEDs have the advantages of a small size and the ability to generate directional radiation. However, the low output power means that there may not be a radiation across the area being treated, with sufficient uniformity and intensity.

There is therefore a need for a compact UV-C purification system which prevents micro-organisms from entering water piping through the point of dispense, and which is effective over the full dispensing area.

SUMMARY OF THE INVENTION

The invention is defined by the claims.

According to examples in accordance with an aspect of the invention, there is provided an in-line fluid purification system for purifying a fluid or fluid flow, comprising:

a jacket surrounding a fluid passageway, formed of a UV transmissive material;

one or more UV LEDs for coupling UV radiation into the jacket, wherein the jacket is adapted to couple UV radiation from the UV LED all around the outer periphery of the passageway.

In this system, a jacket is used to disperse UV-C radiation around and into a fluid passageway. The radiation coupled into the fluid in the passageway provides a barrier for micro-organisms entering the water piping from the outside, maintaining a sanitized system.

The term purification is used generally to indicate that there is treatment of the fluid. In practice, the purification comprises disinfection.

The term jacket is used generally to describe the UV transmissive ring, sleeve, surround, or outer enclosure element. This may be a scattering element or it may be a waveguiding element, for example, an annular waveguide. The jacket may be located around a fluid passageway, that is, to define the fluid passageway within the UV transmissive element. The UV transmissive element may substantially encompass the circumference of the fluid passageway(s). It may also be a collar that is fitted inside the pipe near the point of dispense, wherein the collar may locate one or more LEDs. The LEDs may be configured to emit UV radiation directly towards the fluid passageway(s) or they may be configured to emit in another direction such that the light is in-coupled into the jacket (acting as a wave guide or as a scattering element) before being emitted into the fluid passageways. This means that one LED may be able to substantially emit UV LED all around the fluid passageway. The jacket is intended to act as an optical member that optimizes the distribution of the light such that the UV light is, for example, homogeneous around the perimeter of the fluid passageway, or by further example, such that the UV light is emitted such that the entire cross section of the fluid passageway is irradiated by UV radiation.

This may prove advantageous for cost reasons as UV LEDs are still comparatively expensive compared to standard visible light emitting LEDs. Another advantage may be a decreased thermal load as fewer LEDs are incorporated into the jacket. UV emitting LEDs have a lower Wall Plug Efficiency (WPE) than visible light emitting diodes. This means that a lower amount of the energy that is input into the LED is emitted as photons, the remainder is converted into heat that needs to be dissipated. A yet further advantage is that due to a lower number of LEDs being required due to the light spreading and scattering properties of the jacket the entire device may be smaller than a device having multiple LEDs surrounding a fluid passageway. The jacket may be configured so that radiation from the UV LED can pass around the jacket, at least to a location diametrically opposite a position of the UV LED and then into the passageway. By way of example, the transmissive material of the jacket may have a UV transmission of at least 60% per cm, for example at least 70%, 80%, 90% or even 95% transmission per cm. The jacket is intended to optimise the distribution of the UV radiation by spreading the beam around the perimeter of the fluid passageway.

The jacket may transmit the UV radiation such that it substantially encompasses the fluid passageway(s), for example, to ensure that the entire cross section of the fluid passing through the passageway is irradiated by UV radiation. This may allow a higher flow rate of fluid to be dispensed whilst still being irradiated with the required dose of UV radiation as compared to a system that has multiple, discrete LEDs which emit non over-lapping regions of UV radiation towards the fluid.

The inventors have realized that the use of multiple LEDs around the periphery of the fluid may limit the bore of the fluid passageway that is available for the fluid to flow through. Conversely a single LED may increase the bore of the fluid passageway available for the fluid to flow through but measures must be taken to ensure that the amount of UV radiation (also known as the radiation dose) is sufficient to offer acceptable levels of purification.

The system may be for purifying a flow of fluid, such as a flow of liquid such as water. In this case, purification is provided to the flowing liquid, which typically comprises water. This requires one LED with a high UV output or multiple LEDs with a low UV output. Alternatively, the system may be for purifying a static cross section of fluid standing in the passageway. In this way, a sanitized barrier is present between the outside of the passageway and the inside, and this can be achieved with a LED with a low UV output, which LEDs are already available on the market. This static cross section may be a liquid such as water, but it may also be a gas such as air.

To prevent contamination entering a fluid supply via the dispense point, the invention enables a small UV-C source to be provided together with means to disperse the UV-C radiation over the entire surface of the point of dispensing. By deactivating incoming micro-organisms, the dispense system is less prone to micro-biological contamination. This results in dispensed water with less active microbiological content, and in reduced sanitation effort for water dispense equipment.

In one example, the jacket comprises a UV scattering material. In this way, the UV radiation is scattered over the entire cross section of the passageway, and enters the fluid in the passageway from all sides, that is to say, the UV beam emitted by the LED is spread by the jacket such that the UV radiation has an optimized distribution.

The UV scattering material may comprise polycrystalline aluminum oxide, quartz, UV transparent glass or silicone.

In another example, the jacket, acting as an optical element, comprises an annular waveguide, wherein the UV LED radiation output is adapted at least partially to pass around the waveguide by total internal reflection. This example also provides an optimized distribution of the radiation, this optimization may be that the radiation is spread by the optical element The radiation enters the passageway when the waveguide function is interrupted. This may take place, for example, after reflection by a reflecting coating on the outside of the jacket. Alternatively, the waveguiding function may be interrupted by the passage of water flowing past the waveguide thus reducing the critical angle and allowing the radiation to be outcoupled from the waveguide.

Alternatively, the waveguiding function may be interrupted by an optical outcoupling structure on the walls of the fluid passageway. These outcoupling structures can be surface deformations such as ridges or patterns, they may be lenses, for example micro optic lenses (MLO), they may be dots of paint or they may be patterns that are etched on the surface.

The system may comprise a single UV LED. This enables a low cost and compact system.

The jacket may be for surrounding one passageway or it may surround a more complex point of dispense system with two or more passageways, for example if multiple fluids are to be mixed at the point of dispense, such as a mixer tap where hot and cold water are mixed before dispensing.

A UV reflecting coating may be provided around the outside of the jacket wherein the UV LED is within the jacket, this can be envisioned as a layer of reflection between the outer surface of the jacket and the inner surface of the pipe in which the device is located. This improves the efficiency of the system by preventing the loss of radiation by absorption by materials around the jacket like, e.g., the pipe of a tap.

The reflecting coating may comprise or be connected to a heat dissipation unit. In this way it performs two functions, of coupling heat away from the UV LED as well as retaining UV radiation within the passageway.

The reflecting coating may for example be for fitting flush within the pipe of a tap, so that there is a thermal coupling between the jacket and the tap. In this way, the tap itself functions as a heat sink. The fluid flow in the tap also performs a heat sinking function.

The invention also provides a tap comprising a system as defined above mounted within a fluid passageway of the tap.

Examples in accordance with another aspect of the invention provide an in-line fluid purification method for purifying a fluid or fluid flow, comprising:

surrounding a fluid passageway with a jacket formed of a UV transmissive material;

coupling UV radiation into the jacket from a UV LED, wherein the jacket couples UV radiation from the UV LED all around the outer periphery passageway.

The jacket may comprise a UV scattering material for example polycrystalline aluminum oxide.

The method may comprise providing UV radiation around the passageway using an annular waveguide.

The method may comprise surrounding two or more passageways with the jacket.

The method may also comprise reflecting UV radiation reaching the outside of the jacket back into the jacket. Heat is preferably dissipated from the outside of the jacket.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an in-line fluid purification system which uses a jacket surrounding a fluid passageway, formed of a UV transmissive material. The jacket may be surrounded by a UV reflective material. UV radiation is coupled into the jacket, and the jacket disperses and reflects the radiation over the entire cross section of the passageway. In this way, UV illumination of the full cross section of a fluid passageway is ensured. This may be advantageous in increasing the flow rate of liquid that it is possible to irradiate using this device. An increase in flow rate requires that the treatment time of each unit (ml, liter, $mm^2$, $cm^2$, $m^2$ etc.) of fluid is reduced. This optimized distribution of radiation may also mean that fewer LEDs are required to maintain an acceptable fluid flow and treatment rate.

The system may comprise a UV-C LED. However, the same approach may be used for other UV wavelengths, for example UV-A radiation in combination with a photo catalyst which then creates radicals in water.

Figure 1A:
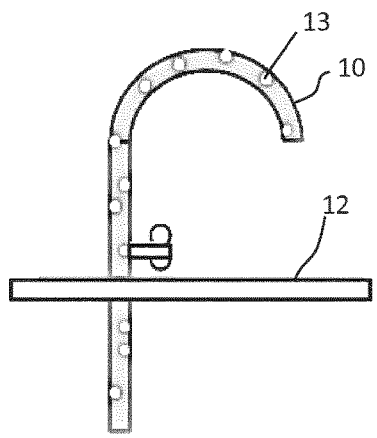
FIGS. 1A to 1C show a non-purified water tap and two approaches to water tap purification.
Figure 1B:
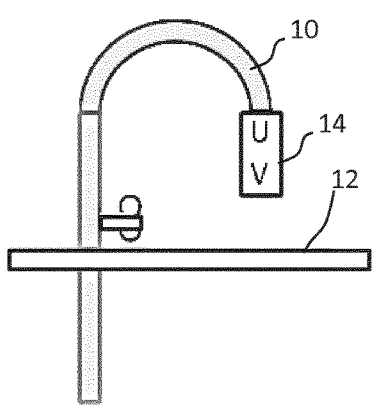
Figure 1C:
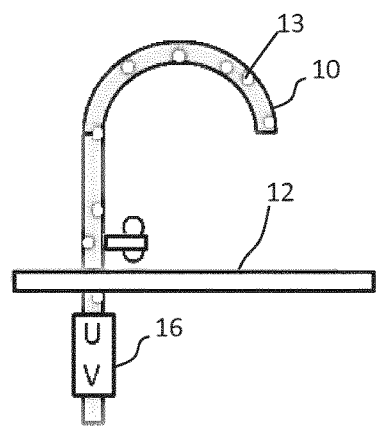

FIG. 1A shows a tap 10 mounted through a work surface 12, with no UV treatment. As a result, microbiological contamination 13 exists. FIG. 1B shows a UV treatment head 14 at the spout of the tap and FIG. 1C shows an in-line UV treatment unit 16 beneath the work surface 12. The provision of treatment below the work surface means that microbiological contamination 13 still exists in the pipe leading to the tap outlet. It would therefore be desirable to have a UV-C treatment system at the tap outlet, but for such a system to be aesthetically acceptable, it needs to be compact.

The use of UV-C LEDs enables a small compact water treatment unit to be provided. However, to illuminate the full cross section of a water flow, typically many UV-C LED sources are needed around the water passageway, which increases cost and requires a large amount of space, which will either increase the outer diameter of the device or decrease the size of the bore that is provided for the fluid to flow through. If the external diameter of the device is increased, the physical size of the tap or pipe that the device is located in must, correspondingly, be increased. If the bore of the fluid passageway is decreased this will limit the amount of fluid that can be passed through the device in a unit of time (the flow rate).

Figure 2A:
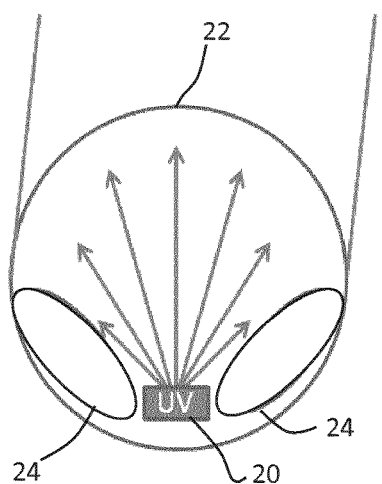
FIGS. 2A to 2C show in cross section perpendicular to the flow direction three approaches to water purification.
Figure 2B:
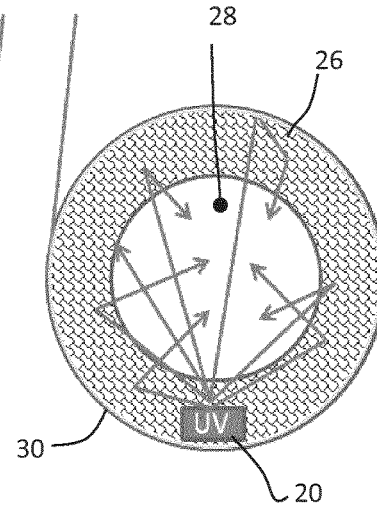
Figure 2C:
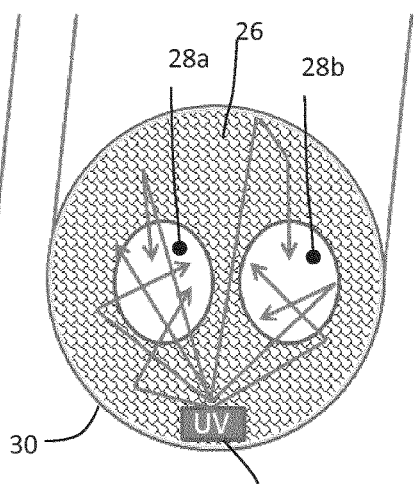

FIG. 2 shows three examples of UV-C treatment system, in cross section perpendicular to the flow direction along a passageway. FIG. 3 shows corresponding cross sections in a plane parallel to the flow direction.

Figure 3A:
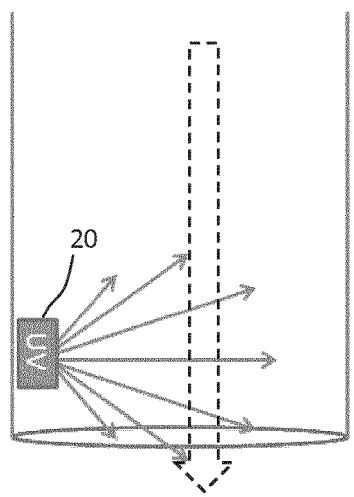
FIGS. 3A to 3C show in cross section parallel to the flow direction three approaches to water purification corresponding to FIGS. 2A to 2C.

FIGS. 2A and 3A show a UV-C LED 20 mounted within a fluid pipe for irradiating a water flow along the pipe. The LED is mounted generally at an outer edge of the inside of the pipe and faces radially inwardly. This provides illumination of the cross section of the fluid pipe 22 but there are regions 24 where there is a low intensity of UV radiation.

Figure 3B:
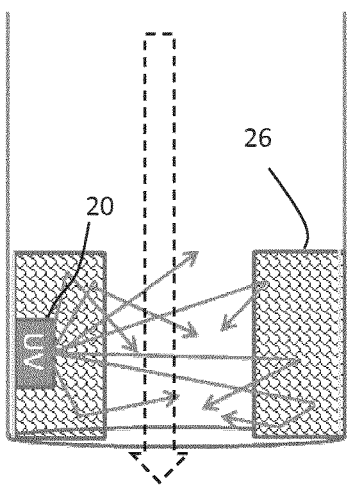
Figure 3C:
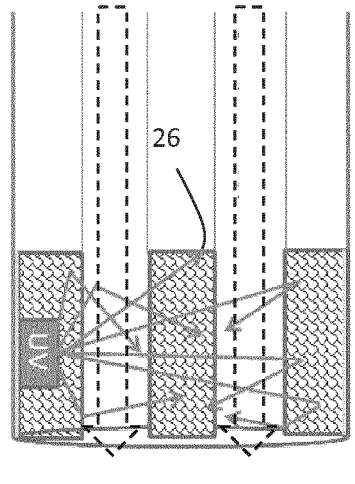

FIGS. 2B and 3B show an arrangement in accordance with a first example of the invention.

A jacket 26 (which may also be described as a ring, sleeve, surround, or outer enclosure) surrounds a fluid passageway 28. The jacket may be within an outer pipe, or it may itself define the outer periphery. Thus, the jacket itself defines and surrounds the fluid passageway or passageways. The jacket is formed of a UV transmissive material by which it is meant that UV-C radiation in particular is able to propagate through the material of the jacket, and therefore around the jacket, increasing the distribution of the radiation by optimizing the distribution of the radiation.

The UV-C radiation can propagate at least from one side of the jacket to the other side of the jacket, and more preferably can propagate around at least one full circumference, or around at least 2, 5 or 10 full circumferences before absorption. By way of example, the transmissive material of the jacket may have a UV transmission of at least 60% per cm, for example at least 70%, 80%, 90% or even 95% transmission per cm.

In addition, there are reflections at the inner and outer circumferential boundaries of the jacket so that the UV-C radiation is able to propagate around the full periphery of the jacket even when the UV-C radiation is only provided from one angular location.

The main functions of the jacket are to provide a location for the UV-C LED 20, to guide UV-C radiation to the fluid in the passageway 28 and to disperse radiation so there are no dark spots. As will be explained below, the jacket also allows for complex dispense points with multiple passageways, using only one LED.

A reflector is provided at the exterior of the jacket which conserves radiation that would otherwise be absorbed outside the jacket.

The UV-C LED is placed within the jacket, namely between the radial inner interface at the passageway boundary and the radial outer surface of the jacket. The jacket thus isolates the LED from the fluid in the passageway. In particular, the jacket may be a solid material. Electrical connections may be made to the UV-C LED from the outside of the jacket. The jacket for example, may comprise a molded waterproof solid.

The jacket conducts the UV-C radiation of the UV-C LED 20 into water or air standing in the passageway or water flowing along the passageway just before it leaves an outlet. Thus, the fluid may be a liquid or a gas. When standing fluid is purified, the jacket forms a barrier between the exterior of the passageway and the interior of the passageway. For the example of a tap, when the tap is turned off, there may either be water or air standing in the end of the tap, depending primarily on the diameter of the passageway, the capillary forces present and the direction in which the tap passageway points, it can be seen that a tap having, for example, a horizontal pipe before an angled outlet would have different fluid retention properties from a tap wherein the fluid passageway simply points in a downwards direction.

In the example of FIGS. 2B and 3B, the jacket is formed from a UV-C scattering material. The scattering serves to convert the directional output of the UV-C LED into a more general radiation pattern. As shown, the UV-C LED faces radially inwardly towards the passageway 28. Some UV radiation passes directly into the passageway for partial or complete absorption by the water. Unabsorbed radiation reaches the jacket at the opposite side, and is then scattered with a random angle. This random angle scattering makes the overall radiation more uniform. Other UV radiation initially directed away from the passageway 28 is scattered by the jacket and redirected towards the passageway 28.

A UV reflector 30 is preferably provided on the outside periphery of the jacket so that any UV-C radiation which reaches the outer periphery (with or without having been scattered) is reflected back into the jacket. The reflector is for example at least partly diffuse reflective.

The reflector is for example, formed from aluminum, chromium or alumina (aluminum oxide).

Heat is dissipated from the outside of the jacket. This may be achieved by the water pipe itself. However, the material of the jacket itself, such as polycrystalline aluminum oxide (PCA), may function as a heat transfer layer to transfer heat from the UV-C LED to the water.

The jacket may surround and define one or more passageways. FIGS. 2B and 3B show a second example with two passageways 28a, 28b. These passageways then connect to separate water pipes.

The passageways formed in the inside of the jacket may be in direct contact with the fluid. However, it is also possible for an internal water pipe to be connected within the jacket. An internal water pipe running through the jacket may be formed from a UV transparent material such as quartz, silicone, or UV-C transparent glass. It may also comprise fluorinated ethylene propylene (known as Teflon (Trade Mark) FEP) or ethylene tetrafluoroethylene (ETFE) or polytetrafluoroethylene (PTFE).

The jacket may be formed as a molded component.

In both examples above, the UV scattering material of the jacket for example comprises polycrystalline aluminum oxide (PCA). PCA is translucent for UV-C so that the radiation is scattered and reflected. Other examples of material for the jacket include UV-C transparent materials such as UV-C transparent glass, quartz (SiO2) or silicone. Other materials which may be used, again include fluorinated ethylene propylene (known as Teflon (Trade Mark) FEP) or ethylene tetrafluoroethylene (ETFE) or polytetrafluoroethylene (PTFE).

Where these materials are transparent (rather than translucent) they may be made to scatter to the desired degree by adding scattering elements such as air bubbles.

The system may comprise a single UV LED, and the jacket. This enables a low cost and compact system.

Figure 4:
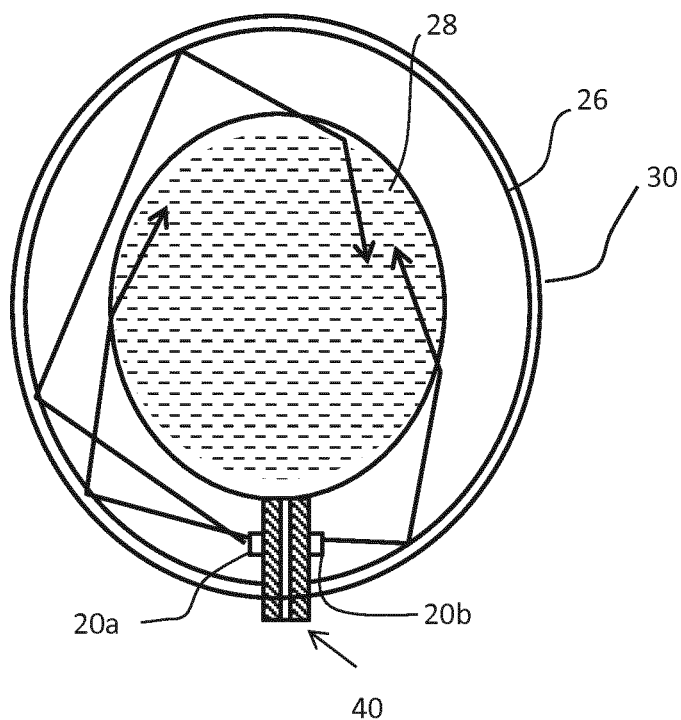
FIG. 4 shows a further approach to water purification.

The examples above make use of a scattering medium. An alternative is to use a waveguide approach as shown in FIG. 4 in which the jacket 26 is formed from a UV transparent (and non-scattering) medium.

In this case, the jacket does not have to be scattering. A diffusive reflector around the jacket may be used to make the radiation inside the passageway more homogeneous as desired. Possible materials for the jacket again include UV-C transparent materials such as UV-C transparent glass, quartz (SiO2) or silicone.

The UV-C LED in this example provides UV radiation in a generally tangential direction. In FIG. 4, the jacket functions as a waveguide. There are reflections at the outer periphery, and these may be total internal reflections or specular reflections or diffuse reflections from the reflecting coating.

The UV radiation enters the passageway by a refractive interface between the jacket and the fluid in the passageway (which interrupts total internal reflection). If a diffuse reflecting outer coating is used, the radiation will approach the interface with all angles of incidence. Outcoupling structures may again, be provided on the surface of the fluid passageway. These outcoupling structures may be surface deformations such as ridges or patterns, they may be lenses, for example, micro optic lenses (MLO), they may be dots of paint or they may be patterns that are etched on the surface, for example, laser etched.

By way of example, there may be two UV-C LEDs 20a, 20b facing in opposite directions at an LED module 40. There may instead be a single UV-C LED.

As explained above, the outside of the jacket may have a reflecting coating. It may also perform a heat dissipation function. For example, it may be thermally coupled to a tap body. The coating thus provides heat spreading. There may instead be a separate reflector layer and heat spreading layer. There may be only a heat spreading layer (so that reflection is carried out by a housing in which the system is installed) or there may be only a reflector (so that heat dissipation is implemented by a housing in which the system is installed).

Figure 5:
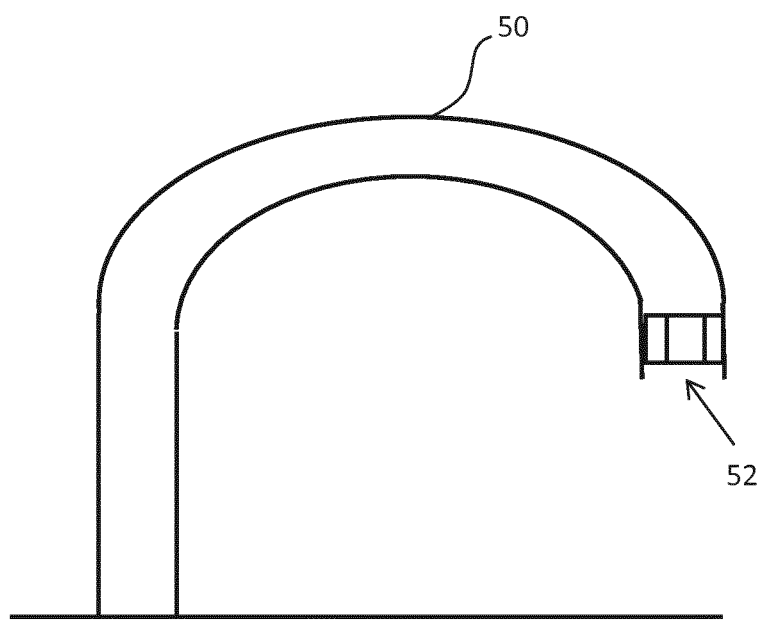
FIG. 5 shows a water purification system applied to a tap.

FIG. 5 shows a tap outlet 50 in which the system described above (shown as 52) is provided at the exit opening. The jacket (and its reflecting coating if provided) is then fitted flush within the pipe of the tap. The tap pipe may itself function as the reflecting coating.

The system may be a unit which fits within another fluid pipe as shown in FIG. 5, for example with an O-ring seal around the unit. However, it may instead be connected in-line to a fluid pipe, with a pipe connection between the passageway at one or both sides of the system.

The jacket may be formed by sintering a molded material into the desired shape.

For an in-flow system, the purification system may be actuated automatically in response to the detection of fluid flow, or else based on detection of when a flow control device (i.e. tap) has been turned on by a user. It may also be used only for cold water and deactivated for hot water for which the purification may not be needed. The purification may be implemented for hot water as well, if thermal management issues are considered.

In a system which provides purification in advance of a fluid flow, the UV LED may be operated periodically or continuously to maintain a barrier for micro-organisms entering from the outside. This means the system can be effective with a lower power LED since in-flow purification is not then needed.

The invention is of interest for taps and other water dispensing outlets or machines.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An in-line fluid purification system for purifying a fluid or fluid flow, comprising:
   a jacket surrounding a fluid passageway, formed of a UV transmissive material;
   one or more UV LEDs for coupling UV radiation into the jacket, wherein the jacket is an optical element adapted to couple UV radiation from the one or more UV LEDs around the outer periphery of the passageway by optimizing the distribution of the UV radiation emitted by the one or more UV LEDs,
   wherein the jacket comprises an annular waveguide, and wherein the annular waveguide comprises a UV scattering material.

2. A system as claimed in claim 1, wherein the UV scattering material comprises polycrystalline aluminum oxide, quartz, UV transparent glass, silicone, fluorinated ethylene propylene, ethylene tetrafluoroethylene or polytetrafluoroethylene.

3. A system as claimed in claim 1, comprising:
a single UV LED; or
multiple UV LEDs.

4. A system as claimed in claim 1, wherein the jacket is for surrounding two or more passageways.

5. A system as claimed in claim 1, further comprising a UV reflecting coating around the outside of the jacket, wherein the one or more UV LEDs is within the jacket, wherein the UV reflecting coating is partly diffuse reflective.

6. A system as claimed in claim 5, wherein the reflecting coating comprises or is connected to a heat dissipation unit.

7. A system as claimed in claim 6, wherein the reflecting coating is for fitting flush within the pipe of a tap for thermal coupling to the pipe of the tap.

8. A tap comprising a system as claimed in claim 1 mounted within a fluid passageway of the tap.

9. An in-line fluid purification method for purifying a fluid or fluid flow, comprising:
surrounding a fluid passageway with a jacket formed of a UV transmissive material;
coupling UV radiation into the jacket from a UV LED, wherein the jacket is an optical element adapted to couple UV radiation from the UV LED all around the outer periphery passageway by optimizing the distribution of the UV radiation emitted by the UV LED, wherein the jacket comprises an annular waveguide, and wherein the annular waveguide comprises a UV scattering material.

10. A method as claimed in claim 9, comprising surrounding two or more passageways with the jacket.

11. A method as claimed in claim 9, comprising reflecting UV radiation reaching the outside of the jacket back into the jacket.

12. A method as claimed in claim 9, comprising dissipating heat from the outside of the jacket by coupling to a pipe of a tap.

* * * * *